(12) United States Patent
Overcash

(10) Patent No.: US 9,294,389 B2
(45) Date of Patent: Mar. 22, 2016

(54) METHOD TO SELECT INTERFACE FOR IP PACKETS WHEN DESTINATION SUBNET IS REACHABLE ON MULTIPLE INTERFACES

(75) Inventor: Michael Overcash, Lawrenceville, GA (US)

(73) Assignee: Cisco Technology, Inc., San Jose, CA (US)

(*) Notice: Subject to any disclaimer, the term of this patent is extended or adjusted under 35 U.S.C. 154(b) by 386 days.

(21) Appl. No.: 13/167,087

(22) Filed: Jun. 23, 2011

(65) Prior Publication Data

US 2012/0331173 A1    Dec. 27, 2012

(51) Int. Cl.
*G06F 15/173* (2006.01)
*H04L 12/725* (2013.01)
*H04L 29/12* (2006.01)

(52) U.S. Cl.
CPC ............ *H04L 45/306* (2013.01); *H04L 61/2015* (2013.01)

(58) Field of Classification Search
USPC ........................................................ 709/238
See application file for complete search history.

(56) References Cited

U.S. PATENT DOCUMENTS

| | | | | |
|---|---|---|---|---|
| 7,554,983 | B1* | 6/2009 | Muppala | 370/392 |
| 7,698,388 | B2* | 4/2010 | Hoover et al. | 709/219 |
| 7,821,985 | B2* | 10/2010 | Van Megen et al. | 370/328 |
| 7,894,456 | B2* | 2/2011 | Koskelainen | 370/401 |
| 7,940,768 | B2* | 5/2011 | Masputra et al. | 370/392 |
| 2005/0111384 | A1* | 5/2005 | Ishihara et al. | 370/254 |
| 2008/0137678 | A1* | 6/2008 | Noguchi | 370/420 |
| 2010/0085975 | A1* | 4/2010 | Wang et al. | 370/395.53 |
| 2011/0310787 | A1* | 12/2011 | Sheriff et al. | 370/315 |

* cited by examiner

*Primary Examiner* — Abdullahi E Salad
(74) *Attorney, Agent, or Firm* — Merchant & Gould P.C.

(57) ABSTRACT

An interface may be selected. First, it may be determined that an application is intended to use a first one of a plurality of network interfaces. Next, a first one of a plurality of routing tables may be selected corresponding to the determined first one of the plurality of network interfaces. Then the selected first one of the plurality of routing tables may be used to communicate with a first device on a first network over the determined first one of the plurality of network interfaces.

22 Claims, 3 Drawing Sheets

METHOD TO SELECT INTERFACE FOR IP PACKETS WHEN DESTINATION SUBNET IS REACHABLE ON MULTIPLE INTERFACES

BACKGROUND

Dynamic host configuration protocol (DHCP) is an automatic configuration protocol used on internet protocol (IP) networks. Computers that are connected to IP networks must be configured before they can communicate with other computers on the network. DHCP allows a computer to be configured automatically, eliminating the need for intervention by a network administrator. It also provides a central database for keeping track of computers that have been connected to the network. This prevents two computers from accidentally being configured with the same IP address. In the absence of DHCP, hosts may be manually configured with an IP address.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
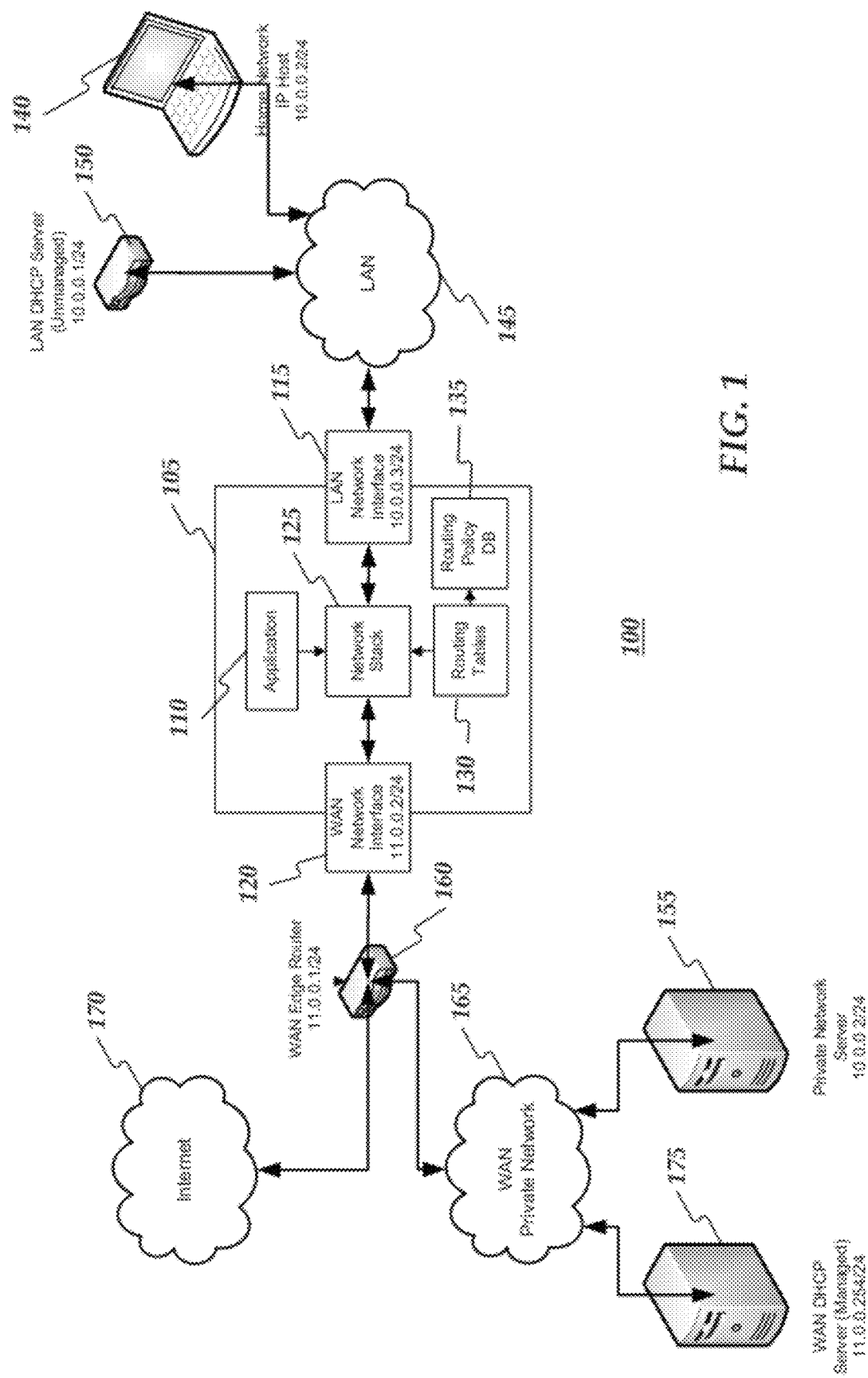
FIG. 1 is a block diagram of an operating environment including a computing device.

An interface may be selected. First, it may be determined that an application is intended to use a first one of a plurality of network interfaces. Next, a first one of a plurality of routing tables may be selected corresponding to the determined first one of the plurality of network interfaces. Then the selected first one of the plurality of routing tables may be used to communicate with a first device on a first network over the determined first one of the plurality of network interfaces.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In a managed IP device (e.g. a settop box), an operator's DHCP server may assign wide area network (WAN) information while a subscriber's DHCP server may assign local area network (LAN) information. While information from both servers is generally combined into a single routing table, the servers may have assigned the same address to two different devices on their respective networks. Each DHCP server may assign a default gateway that is supposed to be used for unknown subnets. However, in this environment, only a single default gateway can be assigned to the routing table and the other may be discarded. Consequently, an address conflict may exist that may be addressed by embodiments of the disclosure.

FIG. 1 is a block diagram of an operating environment 100. As shown in FIG. 1, operating environment 100 may include a computing device 105 that may execute application 110. Computing device 105 may communicate using a first network interface 115 (e.g. a LAN network interface) or a second network interface 120 (e.g. a WAN network interface). While executing application 110, computing device 105 may utilize a network stack 125, routing tables 130, and a routing policy database (DB) 135.

Using first network interface 115, computing device 105 may communicate with a first device 140 over a first network 145 (e.g. a LAN.) First device 140 may have been assigned its network address (e.g. 10.0.0.2/24) by a first DHCP server 150 that may be unmanaged. First DHCP server 150 may comprise a subscriber's DHCP server. Using second network interface 120, computing device 105 may communicate with a second device 155 (e.g. through a router 160) over a second network 165 (e.g. a WAN.) Router 160 may comprise, for example, a cable modem termination system (CMTS), digital subscriber line access multiplexer (DSLAM), or any other type edge router. Second device 155 may have been assigned its network address (e.g. 10.0.0.2/24) by a second DHCP server 175 that may be managed. Second DHCP server 175 may comprise an operator's DHCP server. Using second network interface 120, computing device 105 may also communicate with other devices (e.g. through router 160) over Internet 170. While embodiments of the disclosure are described in terms of DHCP, embodiments of the disclosure may use DHCPv6 and are not limited to any particular protocol or protocol version.

As will be described in greater detail below, embodiments of the disclosure may allow application 110 executing on computing device 105 to communicate with either first device 140 (e.g. address 10.0.0.2) and second device (e.g. address 10.0.0.2) even though an address conflict exists (e.g. they may have the same network address). Embodiments of the disclosure may also resolve address conflicts between first network 145 (e.g. the LAN) and Internet 170.

Figure 2:
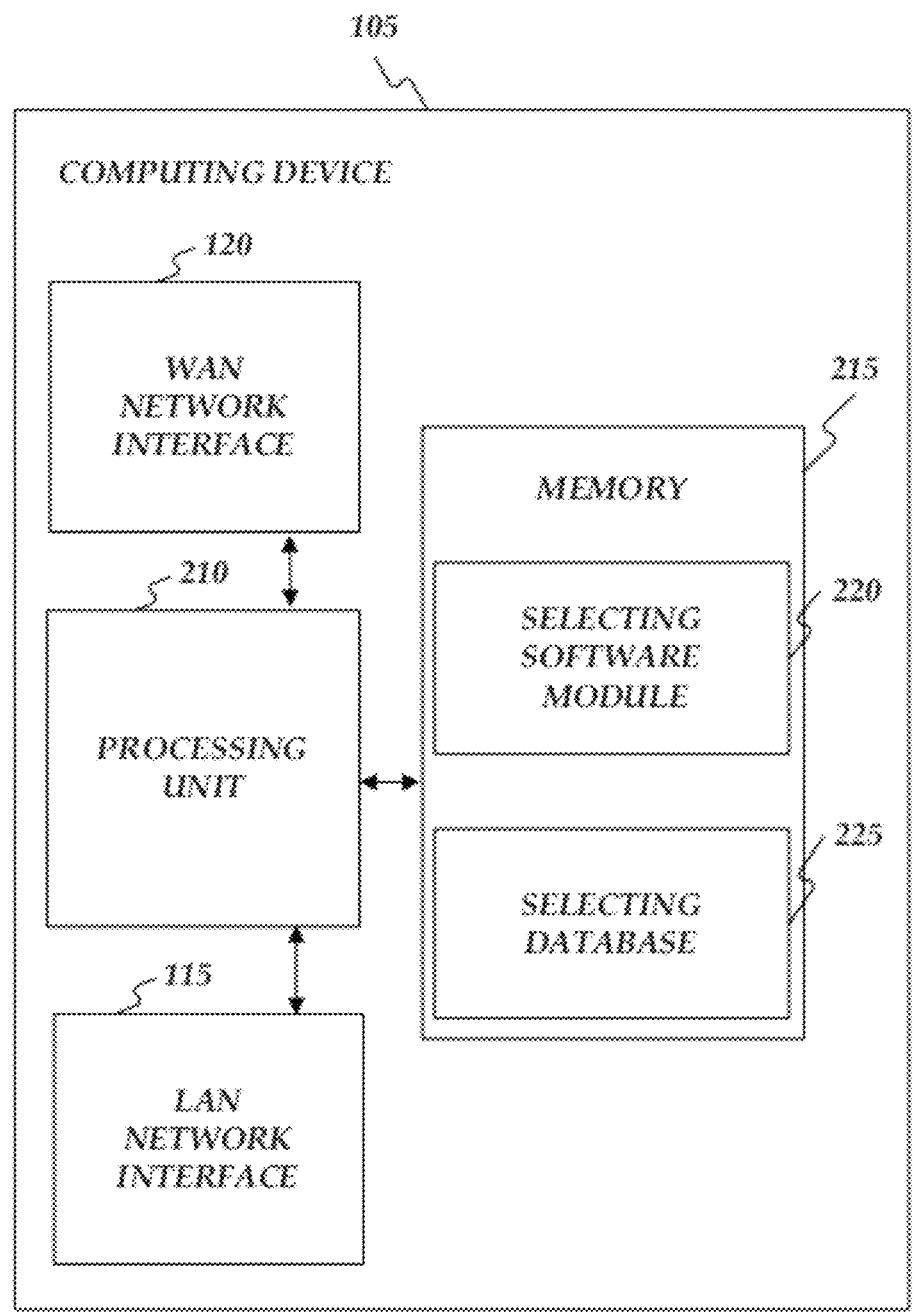
FIG. 2 is a block diagram of the computing device.

FIG. 2 shows computing device 105 in more detail. As shown in FIG. 2, computing device 105 may include a processing unit 210 and a memory unit 215. Memory unit 215 may include a selecting software module 220 and a selecting database 225. While executing on processing unit 205, selecting software module 220 may perform processes for selecting an interface, including for example, one or more stages from method 300 described below with respect to FIG. 3.

Selecting processor 205 ("the processor") may be implemented using a set-top box, a digital video recorder, a cable modem, a mobile device, a personal computer, a network computer, a mainframe, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

Figure 3:
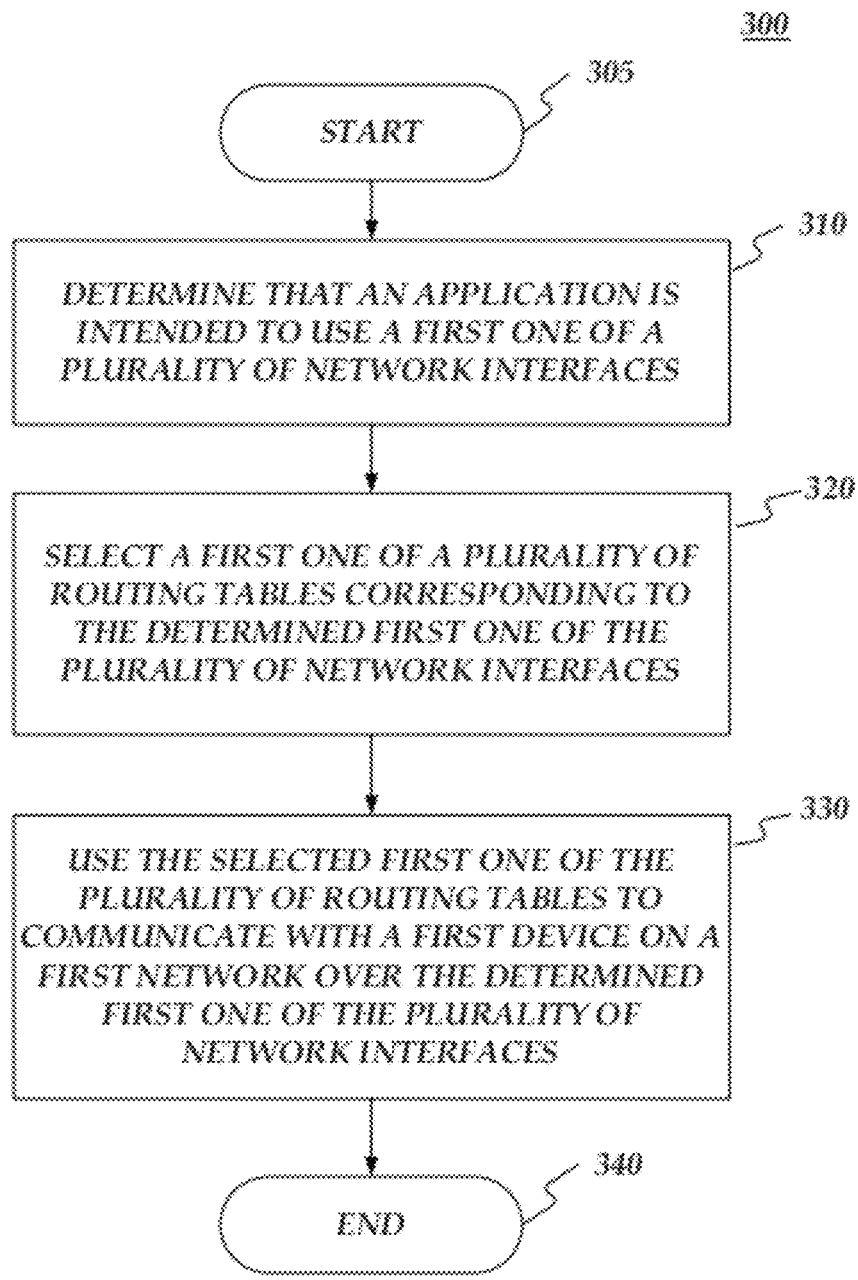
FIG. 3 is a flow chart of a method for selecting an interface.

FIG. 3 is a flow chart setting forth the general stages involved in a method 300 consistent with an embodiment of the disclosure for selecting an interface. Method 300 may be implemented using computing device 105 as described in more detail above with respect to FIG. 2. Ways to implement the stages of method 300 will be described in greater detail below.

Method 300 may begin at starting block 305 and proceed to stage 310 where computing device 105 may determine that application 110 is intended to use a first one of a plurality of network interfaces (e.g. first network interface 115 or second network interface 120). For example, the operating system of computing device 105 may receive from application 110 data indicating the first one of the plurality of network interfaces (e.g. first network interface 115) is intended to use by application 110.

In a managed IP device (i.e. computing device 105), a system operator's DHCP server (e.g. second DHCP server 175) may assign WAN information while a subscriber's DHCP server (e.g. first DHCP server 150) may assign LAN information. With conventional systems, information from both servers (i.e. system operator's DHCP server and subscriber's DHCP server) may be combined into a single routing table. Each DHCP server will assign a default gateway (e.g. network interface) that is supposed to be used for unknown subnets. However, with conventional systems, only a single default gateway can be assigned to the routing table and the other is discarded. Generally, in conventional systems, the WAN gateway will be used and the LAN gateway will be discarded. This makes communication with subnets behind the LAN gateway impossible in conventional systems.

Another problem occurs with conventional systems if the LAN subnet is used on the WAN because it will be impossible to communicate with any WAN devices on that subnet, as all IP packets will end up going out the LAN interface. For example, the home (e.g. subscriber's) DHCP server may assign a LAN IP address of 10.0.0.7 in the 10.0.0.0/24 subnet. But the 10.0.0.0/24 subnet may be used for multiple system operator (MSO) servers in a headend in a conventional system. Consequently, any attempt to send a packet to the 10.0.0.0/24 in the conventional system will be delivered to the LAN interface in this example. Consistent with embodiments of the present disclosure, however, it is possible to send home networking traffic out the LAN interface and other traffic out the WAN interface.

Consistent with embodiments of the disclosure, certain applications may be intended to use a LAN interface (e.g. first network interface 115) for all traffic, while other applications may be intended to use a WAN interface (e.g. second network interface 120). In both cases, application 110 may use a bind( ) or SO_BINDTODEVICE operation to communicate the correct interface (e.g. first network interface 115 or second network interface 120) to computing device 105's operating system regardless of IP addresses assigned by first DHCP server 150 and second DHCP server 175. Consequently, consistent with embodiments of the disclosure, standard socket APIs may be used to indirectly specify a routing table to use when the routing tables contain conflicting information. In other words, application 110 can specifically request a desired IP interface (e.g. first network interface 115 or second network interface 120) using, for example, standard socket APIs. In response, the operating system of computing device 105 may be configured to apply one of several contradictory routing tables (e.g. within routing tables 130) based on a source IP address of a packet to be sent.

In some situations, application 110 may not provide any data as to which interface to use. Furthermore, the address of a data packet that application 110 is attempting to communicate may correspond to two different devices. For example, routing tables 130 may include a first routing table for devices on first network 145 and a second routing table for devices on second network 165. First DHCP server 150 (e.g. unmanaged) may have assigned to first device 140 the address 10.0.0.2 that was recorded in the first routing table. Second DHCP server 175 (e.g. managed) may have assigned to second device 155 the address 10.0.0.2 that was recorded in the second routing table. Consequently, there may be a conflict between the first routing table and the second routing table because two devices may have the same IP address. Accordingly, in this situation in determining what network interface the application is intended to use, computing device 105 may: i) determine that there is a conflict between the first routing table and the second routing table; and then; ii) select a predetermined interface. For example, each time a conflict is discovered, computing device 105 may always use the predetermined interface such as second network interface 120.

From stage 310, where computing device 105 determines that application 110 is intended to use the first one of a plurality of network interfaces, method 300 may advance to stage 320 where computing device 105 may select a first one of routing tables 130 corresponding to the determined first one of the plurality of network interfaces. For example, consistent with embodiments of the disclosure, three routing tables (e.g. routing tables 130), may be defined: i) a main table that may describe the directly attached subnets (this may be used for address resolution protocol (ARP) traffic and also may act as the default routing table); ii) a WAN-specific routing table that may describe only the WAN routing entries; and iii) A LAN-specific routing table that may describe only the LAN routing entries.

The policy table (e.g. routing policy database 135) may be configured to select the LAN routing table from routing tables 130 when the source address belongs to the LAN interface (e.g. first network interface 115). The WAN table may be selected table from routing tables 130 when the source address belongs to the WAN interface (e.g. second network interface 120). In addition, packets destined for the WAN subnet may also use the WAN table. Finally, a default rule may be installed so that all other packets use the main routing table.

Once computing device 105 selects the first one of the routing tables 130 in stage 320, method 300 may continue to stage 330 where computing device 105 may use the selected first one of the routing tables 130 to communicate with first device 140 on first network 145 over the determined first one of the plurality of network interfaces. For example, computing device 105 may use the selected first one of the routing tables 130 to look up routing information in order to communicate data packets to first device 140 through first network interface 115. Once computing device 105 uses the selected first one of the plurality of routing tables in stage 340, method 300 may then end at stage 350.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining that an application is intended to use a first one of a plurality of network interfaces, wherein determining that the application is intended to use the first one of the plurality of network interfaces comprises determining a first one of a plurality of routing tables to apply based on a routing policy table comprising rules for determination of the first one of the plurality of routing tables based on an Internet protocol (IP) address and binding information associated with data to be sent, the rules comprising:
   a first rule for determining the first one of the plurality of routing tables when the data to be sent is associated with the binding information, the binding information indicating the first one of the plurality of routing tables to apply for the data to be sent, and
   a second rule for determining the first one of the plurality of routing tables when the IP address associated with the data is assigned to more than one of the plurality of routing tables, wherein determining the first one of the plurality of routing tables to apply based on the second rule comprises determining a default routing table as the first one of the plurality of routing tables when the IP address is assigned to two different devices by two different service providers comprising a managed data service provider and an unmanaged data service provider; and
   using the determined first one of the plurality of routing tables to communicate with a first device on a first network over the determined first one of the plurality of network interfaces.

2. The method of claim 1, wherein determining that the application is intended to use the first one of the plurality of network interfaces comprises determining that the application is intended to use the first one of the plurality of network interfaces wherein the first one of the plurality of network interfaces comprises one of the following: a local area network (LAN) interface and a wide area network (WAN) interface.

3. The method of claim 1, further comprising receiving the binding information from the application indicating the first one of the plurality of network interfaces the binding information further indicating a socket associated with the determined first one of the plurality of network interfaces.

4. The method of claim 3, wherein receiving the binding information from the application indicating the first one of the plurality of network interfaces comprises receiving the binding information in response to an operation performed by the application.

5. The method of claim 3, wherein receiving the binding information from the application indicating the first one of the plurality of network interfaces comprises receiving at least one of: bind( ) and SO_BINDTODEVICE.

6. The method of claim 1, wherein determining the first one of the plurality of routing tables comprises determining the first one of the plurality of routing tables comprising one of the following: a local area network (LAN) routing table and a wide area network (WAN) routing table.

7. The method of claim 6, further comprising receiving information for the LAN routing table from a Dynamic Host Configuration Protocol (DHCP) server.

8. The method of claim 6, further comprising receiving information for the WAN routing table from a DHCP server.

9. The method of claim 1, wherein using the determined first one of the plurality of routing tables comprises looking up, in the determined first one of the plurality of routing tables, an address, the address corresponding to the first device on the first network.

10. The method of claim 9, wherein using the determined first one of the plurality of routing tables comprises using the determined first one of the plurality of routing tables wherein the plurality of routing tables include a second one of the plurality of routing tables indicating that the address corresponds to a second device on a second network.

11. A computer-readable storage device that stores a set of instructions which when executed perform a method executed by the set of instructions comprising:
   determining that an application is intended to use a first one of a plurality of network interfaces, wherein determining that the application is intended to use the first one of the plurality of network interfaces comprises determining a first one of a plurality of routing tables to apply based on a routing policy table comprising rules for selecting the first one of the plurality of routing tables to apply from the plurality of routing tables based on an internet protocol (IP) address and binding information associated with a packet to be sent, the rules comprising:
      a first rule for determining the first one of the plurality of routing tables when the data to be sent is associated with the binding information, the binding information indicating the first one of the plurality of routing tables to apply for the data to be sent, and
      a second rule for determining the first one of the plurality of routing tables to resolve a conflict, within a plurality of routing tables, when the IP address of the packet to be sent is associated with more than one of the plurality of tables, and wherein resolving the conflict comprises selecting a default routing table as the first one of the plurality of routing tables to apply in case of the conflict when the IP address is assigned to two different devices by two different service providers comprising a managed data service provider and an unmanaged data service provider; and
   using the determined first one of the plurality of routing tables to communicate with a first device on a first network over the determined first one of the plurality of network interfaces, wherein using the determined first one of the plurality of routing tables comprises looking up, in the determined first one of the plurality of routing tables, an address, the address corresponding to the first device on the first network.

12. The computer-readable storage device of claim 11, further comprises receiving the binding information, wherein receiving the binding information comprises receiving data in response to an operation performed by the application.

13. The computer-readable storage device of claim 12, wherein receiving the binding information comprises receiving the binding information wherein the binding information is one of the following: bind( ) and SO_BINDTODEVICE.

14. The computer-readable storage device of claim 11, wherein determining the first one of the plurality of routing tables comprises determining the first one of the plurality of routing tables comprising one of the following: a local area network (LAN) routing table and a wide area network (WAN) routing table.

15. The computer-readable storage device of claim 14, further comprising receiving information for the WAN routing table from DHCP server.

16. The computer-readable storage device of claim 14, further comprising receiving information for the LAN routing table from a DHCP server.

17. The computer-readable storage device of claim 11, wherein using the determined first one of the plurality of routing tables further comprises using the determined first one of the plurality of routing tables wherein the plurality of routing tables include a second one of the plurality of routing tables indicating that the address corresponds to a second device on a second network.

18. An apparatus comprising:
   a memory storage; and
   a processing unit coupled to the memory storage, wherein the processing unit is operative to:
      determine that an application is intended to use a first one of a plurality of network interfaces, wherein the processing unit being operative to determine that the application is intended to use the first one of the plurality of network interfaces comprises the processing unit being operative to:
         receive data from the application indicating the first one of the plurality of network interfaces, the data being received in response to an operation performed by the application;
         determine a first one of a plurality of routing tables to apply, wherein the first one of the plurality of routing tables to apply is determined based on a routing policy table comprising rules for selecting a routing table from the plurality of routing tables based on an Internet protocol (IP) address and binding information associated with the data, wherein the rules comprises:
            a first rule for determining the routing table from the plurality of routing tables when the data to be sent is associated with the binding information, the binding information indicating the routing table from the plurality of routing tables to apply for the data to be sent, and
            a second rule for determining the routing table from the plurality of routing tables when IP address associated with the data is associated with more than one of the plurality of routing tables, wherein the processing unit is configured to select a default routing table when the IP address is assigned to two different devices by two different service providers comprising a managed data service provider and an unmanaged data service provider;
         and
      use the selected first one of the plurality of routing tables to communicate with a first device on a first network over the determined first one of the plurality of network interfaces.

19. The apparatus of claim 18, wherein the first one of the plurality of network interfaces comprises one of the following: a local area network (LAN) interface and a wide area network (WAN) interface.

20. The apparatus of claim 18, wherein the first one of the plurality of routing tables comprising one of the following: a local area network (LAN) routing table and a wide area network (WAN) routing table.

21. The apparatus of claim 20, further comprising the processing unit being operative to receive information for the LAN routing table from a Dynamic Host Configuration Protocol (DHCP) server.

22. The apparatus of claim 20, further comprising the processing unit being operative to receive information for the WAN routing table from a DHCP server.

* * * * *